April 19, 1949.  C. F. VOYTECH  2,467,543

FLUID SEAL

Filed Sept. 20, 1945

INVENTOR.
Charles F. Voytech
BY

Patented Apr. 19, 1949

2,467,543

UNITED STATES PATENT OFFICE 2,467,543

FLUID SEAL

Charles F. Voytech, Chicago, Ill., assignor to Crane Packing Company, Chicago, Ill., a corporation of Illinois Application September 20, 1945, Serial No. 617,467

7 Claims. (Cl. 286—11)

1

This invention relates to mechanical seals for effecting a fluid-tight seal between relatively rotatable or movable parts and particularly to that type of seal which employs radially disposed surfaces for effecting the seal.

Mechanical seals in wide use at the present time are comprised of an axially fixed surface on one of two relatively rotatable elements to be sealed, a rubbing sealing surface on a sealing washer cooperating with the first surface, a flexible compressible sealing element connecting the washer to the other of the rotatable elements and a spring for exerting a pressure upon the washer in the direction of the first-mentioned sealing surface to maintain the sealing surfaces in contact with one another. The flexible compressible sealing element is generally made of rubber and is molded to the exact size and shape required. Since the machinery in which the seals are to be used varies greatly as to the size of the opening to be sealed and the nature and pressure of the fluid to be retained by the seal in the machinery it is necessary for the manufacturer to invest large sums of money in molds and dies for the various sizes and types of seals which he proposed to market in order to cover the entire field.

The general object of this invention is to provide a seal which is sufficiently compact and inexpensive to render it salable as an ordinary low pressure closure for bearings and the like and yet which is sufficiently rugged to be used as a shaft seal for pumps and other hydraulic machinery in which relatively high pressures on the order of several hundred pounds per square inch may be encountered.

A specific object of this invention is to design a mechanical seal which seals upon a radial surface, the design being such that the flexible member of the seal telescopes tightly into the sealing washer of the seal and is adapted to be preloaded upon a cylindrical surface.

Another specific object of this invention is to provide a seal which is self-contained such that the sealing washer, the sealing element and the spring may be handled as a unit.

These and other objects and features of this invention will become apparent from the following description when taken together with the accompanying drawings, in which Fig. 1 is a section through a seal embodying the features of this invention shown applied to a pump;

Figure 1:
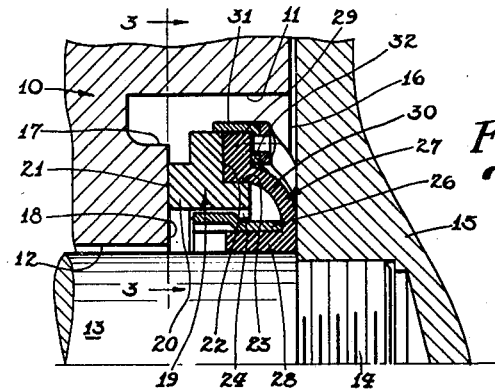
Figure 4:
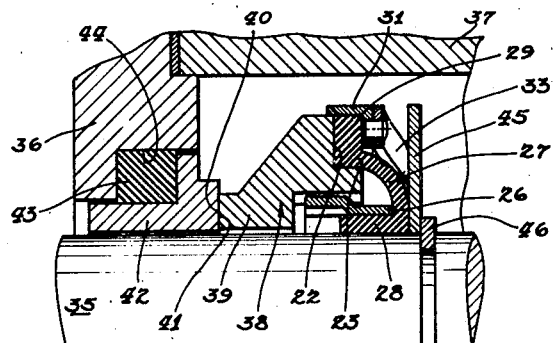
Figure 5:
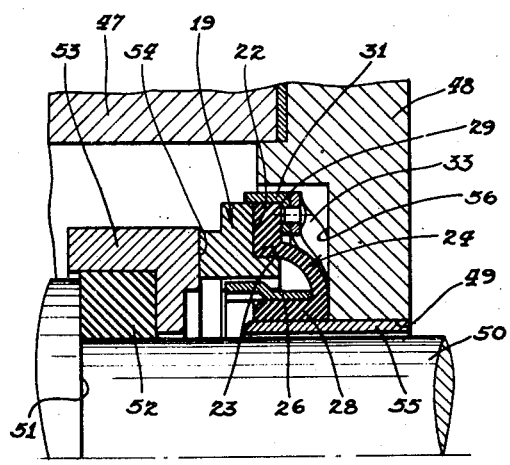
Figure 6:
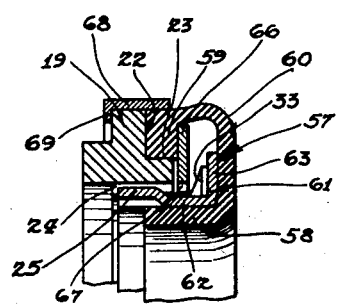

2 lines 3—3 showing the means for driving the washer of Fig. 1;

Fig. 4 is an elevation of a seal embodying the features of this invention shown applied to a high-pressure hydraulic apparatus;

Fig. 5 is a section through the seal of this invention showing the seal used as a closure for either low or high-pressure applications; and Fig. 6 is a section through a modification of the seal of Fig. 1 wherein the spring is mounted internally of the seal.

Referring now to Fig. 1 for a detailed description of the invention, there is shown a pump housing 10 formed with a cavity 11 therein and with an opening 12 through which passes a shaft 13. Said shaft 13 is threaded at 14 to receive a pump impeller 15 (shown fragmentally), said pump impeller 15 having a substantially radially disposed wall 16 which forms one wall of the cavity 11. Pump housing 10 is also formed with an annular axially extending projection 17 on which is formed a sealing surface 18. Said surface 18 is substantially radially disposed with reference to shaft 13 and is suitably machined by grinding or the like to provide a smooth sealing surface.

Figure 3:
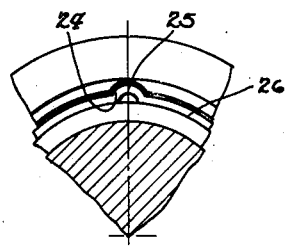
Fig. 3 is a fragmentary elevation taken along

Cooperating with sealing surface 18 is a washer 19 having an annular nose portion 20 provided with a radial surface 21 which is in sliding contact with surface 18 and constitutes the means by which a seal is effected between the relatively stationary housing and the rotatable shaft 13. On the back face of washer 19 is formed a recess, the recess being defined by a radial wall 22 and a cylindrical wall 23. The purpose of the recess will be described hereinafter. One or more notches 24 (Fig. 3) is formed on the interior of washer 19, said notches cooperating with curved lugs 25 which extend outwardly from the otherwise cylindrical surface of a clamping band 26. The lug and notch connection between band 26 and washer 19 constrains the washer to rotate with band 26 but permits said washer 19 to move axially with respect to said band 26.

The sealing element which effects the seal between washer 19 and shaft 13 is shown generally at 27 and is comprised of a relatively thick cylindrical sleeve 28 having an internal diameter which is slightly smaller than the external diameter of shaft 13 such that a snug fit will be effected therebetween. Said sealing element 27 is also provided at its outer periphery with a ring 29 which fits snugly into the recess formed by radial wall 22 and cylindrical wall 23 of washer 19. Connecting ring 29 and cylindrical portion 28 of the flexible element is a diaphragm 30 which is preferably made slightly thinner than either the ring 29 or the cylindrical section 28 so as to flex freely when washer 19 moves axially relatively to the band 26. The diaphragm 30 is sufficiently strong, however, to withstand without rupture any pressures which might be encountered in the installation shown.

Figure 2:
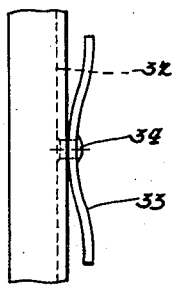
Fig. 2 is a development of a fragment of the spring and the ferrule to which it is applied.

The cylindrical section 28 of the sealing element 27 is pressed tightly upon shaft 13 by band 26, the external diameter of the sleeve portion being slightly greater than the internal diameter of band 26 so that a preloading effect is secured when band 26 and sealing element 27 are assembled upon shaft 13. A ferrule 31 fits over the ring 29 on flexible element 27 and compresses said ring radially inwardly upon the cylindrical wall 23 of washer 19 so that said washer 19 is in effect clamped to the flexible element 27 by ferrule 31. Said ferrule 31 has a radially inwardly extending flange 32 to which may be secured two or more double cantilever type springs 33 (Fig. 2), the strength of which is selected to provide sufficient force to maintain washer 19 and its surface 21 in sealing engagement with surface 18 at all times and under the predetermined conditions of wear. The individual cantilever springs 33 may be secured to flange 32 by means of rivets 34 or by any other suitable means such as soldering, or the like. The contour of springs 33 is preferably such that the means for securing the springs to the flange will not be stressed as the springs are deflected.

The seal just described may be assembled at the factory by first assembling washer 19 upon a driving band 26 with the notches 24 properly indexed relative to the lug 25 and the sealing element 27 may then be slipped into band 26 and into the recess formed by walls 22 and 23 to the position shown, and finally, ferrule 31 is pressed over the ring 29 thereby effectively compressing ring 29 into the recess by the ferrule. There is now assembled a unit which includes all of the necessary elements of a seal and which is ready for installation merely by pressing the entire unit over a suitable shaft such as shaft 13 and pushing the unit back until sealing element 27 strikes an abutment such as wall 16 on pump impeller 15. Alternatively, if the shaft 13 is axially fixed, the assembled sealing unit may be pressed into place from the right as viewed in Fig. 1 by removing impeller 15 and then pressing the unit upon the shaft to approximately the position shown, after which the impeller is screwed back in place.

Referring now to Fig. 4 for a description of a modification of the seal of this invention as adapted to high-pressure installations, there is shown a shaft 35 passing through a closure plate 36 which in turn is secured by means (not shown) to a housing 37. In the space defined by housing 37 and shaft 35 are located the sealing element 27, the ferrule 31, the springs 33 and the clamping band 26, all of said elements being identical with those bearing similar reference characters in Fig. 1. It will be noted that flange 36 and the cylindrical sleeve 28 of the sealing element 27 form in effect either a collar compressed upon the shaft or a stepped region on the shaft. To reduce the fluid pressure upon the sealing surfaces 40, 41 of the seal, it is necessary to balance the fluid pressure on the back of the washer as nearly as possible with a similar amount of pressure on the front face of the washer. This can only be accomplished by dropping the sealing surface on the washer into a recess formed by a shoulder or collar on the shaft. Thus the present seal is well suited for operation with a sealing washer which is designed to operate in a recessed portion of a shaft.

Thus in the Fig. 4 modification there is shown a washer 38 which is provided with the radially disposed wall 22 and cylindrical wall 23 shown in Fig. 1 to receive the ring portion 29 of the sealing element 27, but is also provided with an extension 39, the internal diameter of which is smaller than the external diameter of clamping band 26 but which is slightly larger than the diameter of shaft 35 so as to provide a certain amount of clearance therebetween. The outer radial surface 40 is suitably finished and constitutes one of the sealing surfaces of the seal. Said sealing surface 40 cooperates with a ground and lapped sealing surface 41 formed in a seat 42 which is supported by means of a resilient compressible ring 43 pressed into a recess 44 in closure plate 36. An abutment is provided for the spring 33, the abutment comprising a washer 45 which is held against axial movement to the right as seen in Fig. 4 by means of a snap ring 46.

The unit shown in Fig. 4 is assembled in exactly the same manner as the one shown in Fig. 1. The difference in the shape of the washer 39 does not require any different technique for assembling it relative to the sealing element 27 and the driving band 26. Obviously since the outside diameter of sealing surface 40 on washer 38 is only slightly larger than the outside diameter of driving band 26, the fluid pressure acting on the left-hand side (Fig. 4) of washer 38 will be substantially balanced by the fluid pressure acting upon the sealing element 27 and so much of it as is effective to transmit the pressure to the washer itself. The degree of balance may of course be varied by varying the outside diameter of sealing surface 40 relative to the outside diameter of driving band 26.

Referring now to Fig. 5 for a description of the way in which the sealing unit of this invention may be used as a closure either for a shaft or for some other rotatable machine element such as a bearing, there is shown a housing 47 to which is secured a closure plate 48 having an opening 49 therein through which a shaft 50 passes. In the form selected for illustration shaft 50 is provided with a shoulder 51 against which is pressed a resilient deformable ring 52 made of rubber or the like and which is compressed upon shaft 50 by means of a seal seat 53 having a suitably finished radially disposed sealing surface 54 on the right-hand (Fig. 5) side thereof. Cooperating with sealing surface 54 is a sealing washer 19 which is mounted on a driving band 26 which, in turn, is pressed upon cylindrical portion 28 of sealing element 27. Said cylindrical portion 28 however instead of being compressed upon a shaft is pressed upon a tube 55 which may have a fluid-tight press-fit in opening 49 in closure 48. The ring portion 29 of sealing element 27 is compressed or preloaded into the recess formed by walls 22 and 23 in washer 19 by the ferrules 31 as previously described with reference to Fig. 1. The spring 33 bears directly upon a radially disposed wall 56 on closure plate 48.

To assemble the seal of Fig. 5 closure plate 48 is placed flat upon a plate or bench with wall 56 facing upward and then tube 55 is pressed into opening 49 until it strikes the plate or bench. Next the seal unit including the washer and sealing element 27 is slid over the tube 49 until the sealing element 27 abuts wall 56. The closure plate 48 may then be secured to housing 47 in any suitable manner (not shown).

The modification shown in Fig. 6 differs from those previously described in that the spring is retained between the washer and the sealing element so that no external abutment for the spring is necessary. The washer 19 may be identical to those disclosed in Figs. 1 and 5 and hence is provided with a recess formed by a substantially radial wall 22 and a cylindrical wall 23. The sealing element for washer 19 is shown at 57 and is comprised of a substantially cylindrical portion 58 similar in size, shape and function to cylindrical portion 28 of sealing element 27 in Figs. 1 and 5; a relatively thick ring 59 which fits into the recess formed by surfaces 22 and 23 and a relatively thinner diaphragm portion 60 connecting the cylindrical portion 58 and the ring 59. Intermediate washer 19 and cylindrical portion 58 is a clamping band 61 having a substantially cylindrical portion 62 contacting the outer surface of cylindrical portion 58 of sealing element 57 and a radially disposed flange 63. As in the previously described forms, washer 19 is provided with notches 24 into which are fitted driving lugs 25 formed in driving band 61. A ferrule 66 is placed against ring 59 and extends radially inwardly in the vicinity of driving band 61. Suitable notches 67 may be formed in ferrule 66 to enable the ferrule to pass over the driving lugs 25. The springs 33 are secured to ferrule 66 in such a manner that the notches 25 are located between the ends of the springs and hence the springs do not interfere with the movement of the ferrule past the lug 25. The free ends of the spring 33 abut radially disposed flange 63 on driving band 61 and tend to separate ferrule 66 and flange 63. This results in an axial force on washer 19 since cylindrical section 58 of the sealing element 57 is clamped to a shaft or the like and will cause washer 19 to be urged against the corresponding sealing element on the housing or the closure plate for the housing to which the element may be secured. Alternatively, the springs 33 may be secured to the flange 63 and bear against ferrule 66. It will be observed that diaphragm 60 is bowed so that relative movement between the portion of the diaphragm 60 in contact with flange 63 and ring 59 is readily possible.

The form shown in Fig. 6 may be used in the same installations as the forms shown in Figs. 1 and 5. Obviously a washer such as washer 38 of Fig. 4 may be used in place of washer 19 in the Fig. 6 construction to secure a balanced seal. Because of the presence of flange 63, however, it is also possible to use the seal of Fig. 6 in an installation where two substantially parallel relatively rotatable radial walls are available for sealing rather than a cylindrical surface and a radial surface as in Figs. 1, 4 and 5. Thus the sealing unit of Fig. 6 may be dropped as a whole into a recess in the same manner as water pump seals for automobile engines are at present installed.

When relatively high internal pressure or considerable swelling of the sealing element 57 are encountered, an additional rigid band such as 68 may be used. This band is preferably such as to exert a radially inward compressive force upon ring 59 of the flexible sealing element 57 and may have an inturned edge 69 to assist in locating the band relative to the ring 59 and also to hold washer 19 in place.

Thus the sealing devices herein described comprise complete units which may be adapted for use either as shaft seals or as closures and with the use of interchangeable washers can be balanced hydraulically to any desired extent to relieve the fluid pressure on the sealing surfaces. The various parts of the sealing device can be assembled readily, and when assembled, can be handled together with the spring as a single unit. In one modification an external abutment is required for the spring and in another modification the spring and abutment are self-contained and require no additional element for the operation of the seal. The flexible compressible sealing element used in all modifications is relatively simple to mold, particularly the one disclosed in Figs. 1, 4 and 5.

It is understood that in addition to the modifications disclosed, other modifications might suggest themselves to those skilled in the art and the scope of this invention therefore is not to be limited to the modifications used herein for illustrative purposes but is to be determined by the appended claims.

What is claimed is:

1. A device for effecting a seal between relatively movable elements, said device comprising a sealing washer, a flexible compressible sealing member having a substantially cylindrical portion for engagement with one of the elements and a diaphragm extending from the cylindrical portion into engagement with the washer, a band supported solely by the cylindrical portion and adapted to compress the cylindrical portion upon the element engaged thereby, said band telescoping within the washer and having an axially slidable driving connection with the washer such that relative rotation between the washer and band is prevented but relative axial movement between the washer and band is possible, and means for clamping the outer end of the diaphragm to the washer to effect a fluid-tight seal therebetween.

2. A device for effecting a seal between relatively movable elements, said device comprising a sealing washer, a flexible compressible sealing member having a substantially cylindrical portion for engagement with one of the elements, a diaphragm extending from the cylindrical portion and a relatively thick ring, said washer having a recess to receive said ring, a band supported solely by the cylindrical portion and adapted to compress the cylindrical portion upon the element engaged thereby, said band telescoping within the washer and having an axially slidable driving connection with the washer such that relative rotation between the washer and band is prevented while relative axial movement between the washer and band is possible, and means for clamping the ring of the flexible compressible sealing member to the washer to effect a fluid-tight seal therebetween.

3. A device for effecting a seal between relatively movable elements as described in claim 2, said means for clamping the outer end of the diaphragm to the washer comprising a ferrule having a cylindrical region adapted to encircle the ring and having also a substantially radially disposed flange, spring means secured to said flange so as to be movable therewith, and an abutment for said spring means whereby said spring will exert an axial force upon the washer.

4. A device for effecting a seal between a pair of relatively rotatable elements, one of which has an opening through which the other passes, said device comprising a sealing washer, a flexible compressible sealing member having a substantially cylindrical portion and a diaphragm extending from the cylindrical portion into engagement with the washer, a tube held by the relatively rotatable element having the opening and being in sealing engagement therewith, a band supported solely by the cylindrical portion and adapted to compress the cylindrical portion upon the tube, said band telescoping within the washer and having an axially slidable driving connection with the washer such that relative rotation between the washer and band is prevented while relative axial movement between the washer and band is possible, means for clamping the outer end of the diaphragm to the washer to effect a fluid-tight seal therebetween, and spring means secured to the clamping means and reacting against the said one of the relatively rotatable elements to urge the washer axially into sealing engagement with the other of the said relatively rotatable elements.

5. A device for effecting a seal between relatively rotatable elements as described in claim 4, said band compressing a portion of the diaphragm against the relatively rotatable element having the opening so as to effect a seal between the sealing member and relatively rotatable element directly.

6. A device for effecting a seal between relatively movable elements, said device comprising a sealing washer, a flexible compressible sealing member having a substantially cylindrical portion for engagement with one of the elements to be sealed and a diaphragm extending outwardly and bent back upon the cylindrical portion into engagement with the washer, a band adapted to compress the cylindrical portion upon the element engaged thereby, said band supported solely by the cylindrical portion and telescoping within the washer and having an axially slidable driving connection with the washer such that relative rotation between the washer and band is prevented but relative axial movement between the washer and band is possible, and spring means within the confines of the diaphragm and reacting at one end against the band and at the other end against the washer.

7. A device for effecting a seal between relatively movable elements, said device comprising a sealing washer, a flexible compressible sealing member having a substantially cylindrical portion for engagement with one of the elements to be sealed and a diaphragm extending outwardly and bent back so as to surround the washer, a band supported solely by the cylindrical portion and adapted to compress the cylindrical portion upon the element engaged thereby, said band telescoping within the washer and having an axially slidable driving connection with the washer such that relative rotation between the washer and band is prevented but relative axial movement between the washer and band is possible, a second band compressing the portion of the flexible element surrounding the washer against the washer, a flange extending radially outwardly from the first-mentioned band, and spring means acting in compression between the washer and flange and located within the sealing element.

CHARLES F. VOYTECH.

REFERENCES CITED

The following references are of record in the file of this patent:

UNITED STATES PATENTS

| Number | Name | Date |
|---|---|---|
| 1,931,723 | Fageal et al. | Oct. 24, 1933 |
| 2,195,774 | Freeman et al. | Apr. 2, 1940 |
| 2,200,413 | Christman et al. | May 14, 1940 |
| 2,347,118 | Matter | Apr. 18, 1944 |
| 2,365,065 | Frankenfield | Dec. 12, 1944 |
| 2,379,868 | Curtis | July 10, 1945 |
| 2,440,394 | Cockerill | Apr. 27, 1948 |

FOREIGN PATENTS

| Number | Country | Date |
|---|---|---|
| 874,519 | France | 1942 |